United States Patent [19]

Fletcher et al.

[11] Patent Number: 5,087,428

[45] Date of Patent: Feb. 11, 1992

[54] AIR PURIFYING SYSTEM

[75] Inventors: David Fletcher, Hudson Heights; Barry Welford, Beaconsfield, both of Canada

[73] Assignee: Systemes Ozonics Inc., Beaconsfield, Canada

[21] Appl. No.: 530,207

[22] Filed: May 30, 1990

[51] Int. Cl.$^5$ .................. B01J 19/08; B01J 19/12
[52] U.S. Cl. .................. 422/186.07; 422/186.12; 422/186.21; 422/189; 422/193
[58] Field of Search .................. 422/186.04, 186.07, 422/186.18, 186.21

[56] References Cited

U.S. PATENT DOCUMENTS

| | | | |
|---|---|---|---|
| 1,011,503 | 12/1911 | Shepherd | 422/186.18 |
| 1,169,825 | 2/1916 | Hoofnagle | 204/176 |
| 2,658,868 | 11/1953 | Collison | 422/186.15 |
| 2,822,327 | 2/1958 | Hammesfahr et al. | 204/176 |
| 2,906,686 | 9/1959 | Trüb | 422/186.18 |
| 3,309,304 | 3/1967 | Caplan | 422/186.07 |
| 3,457,160 | 7/1969 | Fortier | 422/186.14 |
| 3,607,709 | 9/1971 | Rice | 422/186.15 |
| 3,838,290 | 9/1974 | Crooks | 422/186.07 |
| 3,903,426 | 9/1975 | Lowther | 204/176 |
| 3,925,673 | 12/1975 | Wright, Jr. | 250/432 |
| 3,949,055 | 4/1976 | Schneider et al. | 423/210 |
| 3,967,131 | 6/1976 | Slipiec et al. | 250/539 |
| 4,049,400 | 9/1977 | Bennett et al. | 55/139 |
| 4,101,296 | 7/1978 | Lowther | 55/33 |
| 4,410,495 | 10/1983 | Bässler | 422/186.18 |
| 4,451,435 | 5/1984 | Hölter et al. | 422/174 |
| 4,650,648 | 3/1987 | Beer et al. | 422/186.07 |
| 4,666,679 | 5/1987 | Masuda et al. | 422/186.2 |
| 4,690,803 | 9/1987 | Hirth | 422/186.18 |
| 4,892,713 | 1/1990 | Newman | 422/186.07 |

Primary Examiner—Brooks H. Hunt
Assistant Examiner—Daniel S. Jenkins
Attorney, Agent, or Firm—Chilton, Alix & Van Kirk

[57] ABSTRACT

A closed container has openings at an input end for drawing air into the container and openings at the output end for passing air out of the container. An ozone generator is disposed inside the container adjacent the input end and a corona generator is disposed in the container adjacent the output end. The corona generator includes a dielectric made of a material having a dielectric constant of 1000 or greater. Impure air which is drawn in at the input end passes over the ozone generator whereby the ozone reacts with the impurities of the impure air to provide purified air. The purified air with remaining ozone is passed over the corona generator means to destroy the remaining ozone.

24 Claims, 3 Drawing Sheets

AIR PURIFYING SYSTEM

BACKGROUND OF INVENTION

1. Field of the Invention

The invention relates to an air purification system. More specifically, the invention relates to such a system which includes an ozone generator means for producing ozone to react with impurities in the air, and which system also includes a high power corona generating device for removing ozone from the purified air.

The invention also relates to a high power corona generating device, and to an air purification system using only the high power corona generating device.

2. Description of Prior Art

Low power ozone generators are now being used as air purifiers to treat air in a variety of commercial applications where air quality is unsatisfactory and where special air treatment is desired. Ozone in present purifiers is created when air is drawn through an electrical corona formed over generator plates at high voltage. Such purifiers rely for their effect on adding ozone to the air and allowing natural diffusion to spread the air and ozone through the area to be treated. The concentration of ozone in atmospheres being treated by present purifiers is low and therefore provides sub-optimal results. Some of the disadvantages of the above-described systems are as follows:

Air throughput into the machine is low so that only a very insignificant amount of air treatment occurs within the machine.

Health regulations require that the concentration of ozone in the ambient air of the workplace should not exceed 50-100 parts per billion. Since this low concentration has very limited air purifying capability, this places a very serious constraint on the efficiency and power of present purifiers used in the manner as above-described.

Air purification systems are also described in U.S. Pat. No. 4,451,435, Holter et al, May 29, 1984, U.S. Pat. No. 3,949,055, Schneider et al, Apr. 6, 1976, and U.S. Pat. No. 4,101,296, Lowther, July 18, 1978.

The '435 Patent illustrates, in FIG. 3 thereof, a system including an ozonizer (ozone generator) 11 and beds of sorption masses and catalyst masses 1-9. In accordance with the '435 Patent, the air purification process requires the application of heat and the subsequent application of cooling to remove impurities from the air. Additionally, the apparatus of the '435 Patent does not include any means for decomposing ozone remaining in the air.

The '055 Patent teaches the use of an aqueous solution of ozone to remove gaseous or smoke-like substances from the air in industrial areas. The '296 Patent teaches an ozone decomposition system. In neither case could large volumes of air be treated economically.

A further air purifying system is illustrated in U.S. Pat. No. 4,049,400, Bennett et al, Sept. 20, 1977. The system as taught by Bennett et al includes an ozone generator and an electrostatic filter. This again does not include any means for decomposing ozone remaining in the air.

It is also known that certain levels of ozone in the atmosphere can be harmful to people, and that even relatively low levels of ozone can have a corrosive nature. Accordingly, air purifying systems which use ozonators to purify the air but which leave the ozone in the air to be spread throughout the environment of the system could be potentially unsatisfactory.

Ozone generators, per se, are also taught in the following patents which constitutes only a partial list of such teachings. U.S. Pat. No. 4,666,679, Masuda et al, May 19, 1987, U.S. Pat. No. 3,903,426, Lowther, Sept. 2, 1975, U.S. Pat. No. 1,169,825, Hoofnagle, Feb. 1, 1916, U.S. Pat. No. 2,822,327, Hammesfahr et al, Feb. 4, 1958, U.S. Pat. No. 3,607,709, Rice, Sept. 21, 1971, U.S. Pat. No. 3,838,290, Crooks, Sept. 24, 1974, U.S. Pat. No. 4,650,648, Beer et al, Mar. 17, 1987, and U.S. Pat. No. 4,690,803, Hirth, Sept. 1, 1987.

SUMMARY OF INVENTION

It is an object of the invention to provide an air purifying system which overcomes the disadvantages of the prior art.

It is a more specific object of the invention to provide an air purifying system which uses an ozone generator to produce a high concentration of ozone.

It is a still further object of the invention to provide such a system wherein the ozone is removed from the treated air before it is returned to the working environment.

In accordance with the invention there is provided an air purifying system comprising:

a closed container having an input end, for receiving impure air, and an output end, through which purified air is expelled;

means for drawing impure air into said closed container at said input end thereof;

ozone generator means for producing a high concentration of ozone, inside said closed container, adjacent said input end thereof;

corona generator means, disposed in said closed container, adjacent said output end thereof;

whereby, said impure air drawn at said input end passes over said ozone generator means, said ozone thereby reacting with said impurities of said impure air to provide purified air, said purified air with remaining ozone passing over said corona generating means;

whereby, ozone remaining in said purified air is destroyed by the corona of said corona generating means instead of being expelled out of said second end of said closed container.

In accordance with the invention there is still further provided an air purifier system, comprising:

a closed container having an input end, for receiving impure air, and an output end through which purified air is expelled;

means for drawing impure air into said closed container at said input end thereof;

corona generator means inside said closed container adjacent said input end thereof;

whereby, said impure air drawn in at said input end passes over said corona generator means to provide purified air purified by the corona generated by said corona generator means;

said purified air being expelled out of said second end of said closed container;

said corona generator means comprising a dielectric made of a material having a very high dielectric constant to thereby produce a very intensive corona having an electric field greater than 3 watts/sq.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
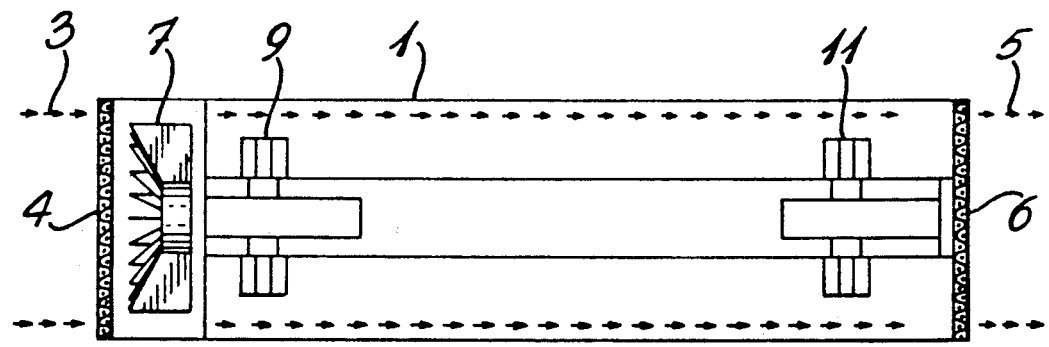
FIG. 1 is a schematic illustration of an air purifier in accordance with the invention.

Referring to FIG. 1, the air purifying system comprises a closed container 1. The closed container can be cylindrical in shape or it can have a square or rectangular cross-section.

The closed container has an input end 3 having a grill 4 and an output end 5 having a grill 6. The grills 4 and 6 at the input and output ends 3 and 5 respectively include a plurality of openings to permit air to enter into the closed container to permit air to be expelled from the interior of the closed container, respectively.

Disposed adjacent the input end 3 of the closed container is a means for drawing air into the container, namely a fan 7. As the air will be drawn in from the environment in which the air purifier is disposed, the air drawn into the container will contain impurities, that is, it will be impure air.

Disposed inside the container adjacent the input end 3 and after the fan 7 is an ozone generator means 9. Disposed adjacent the output end of the container, and inside the container, is a corona generator means 11. Both the ozone generator means 9 and the corona generator means 11 will be further discussed below.

Figure 2:
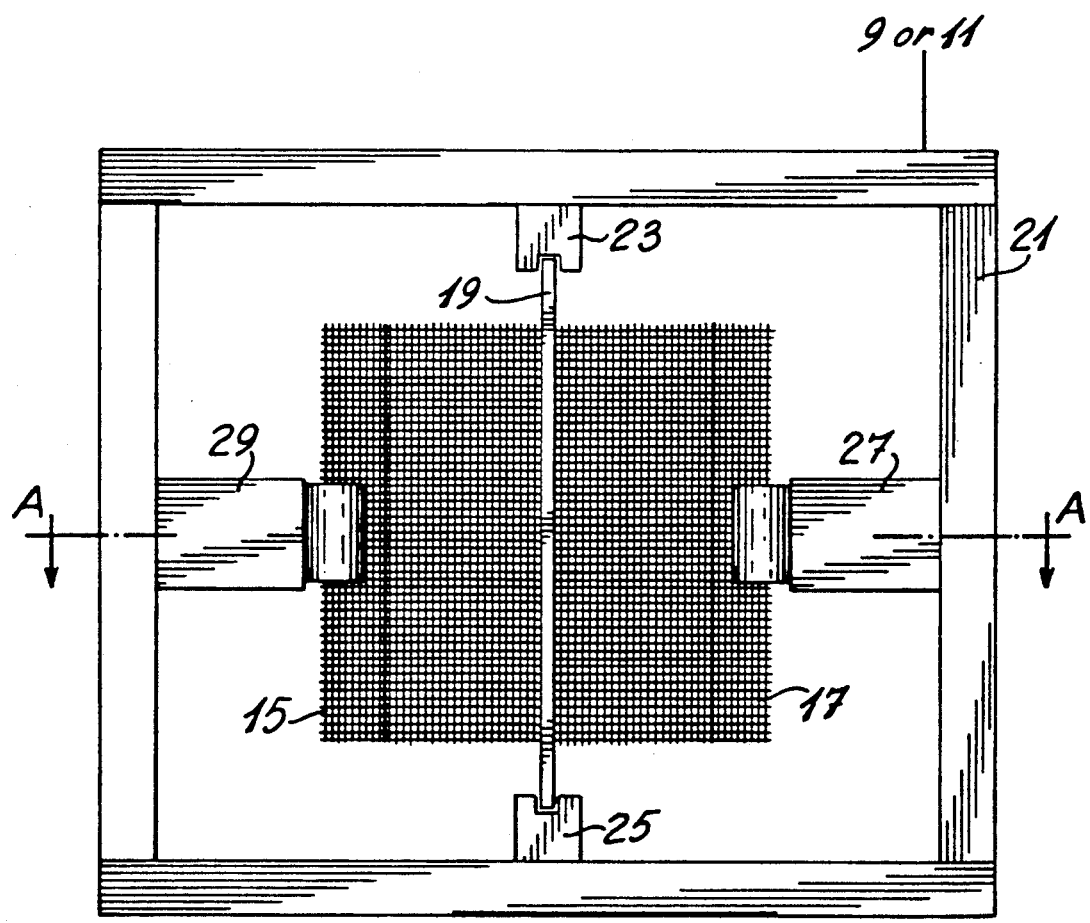
FIG. 2 is a side view of the ozone generator or corona generator means.
Figure 3:
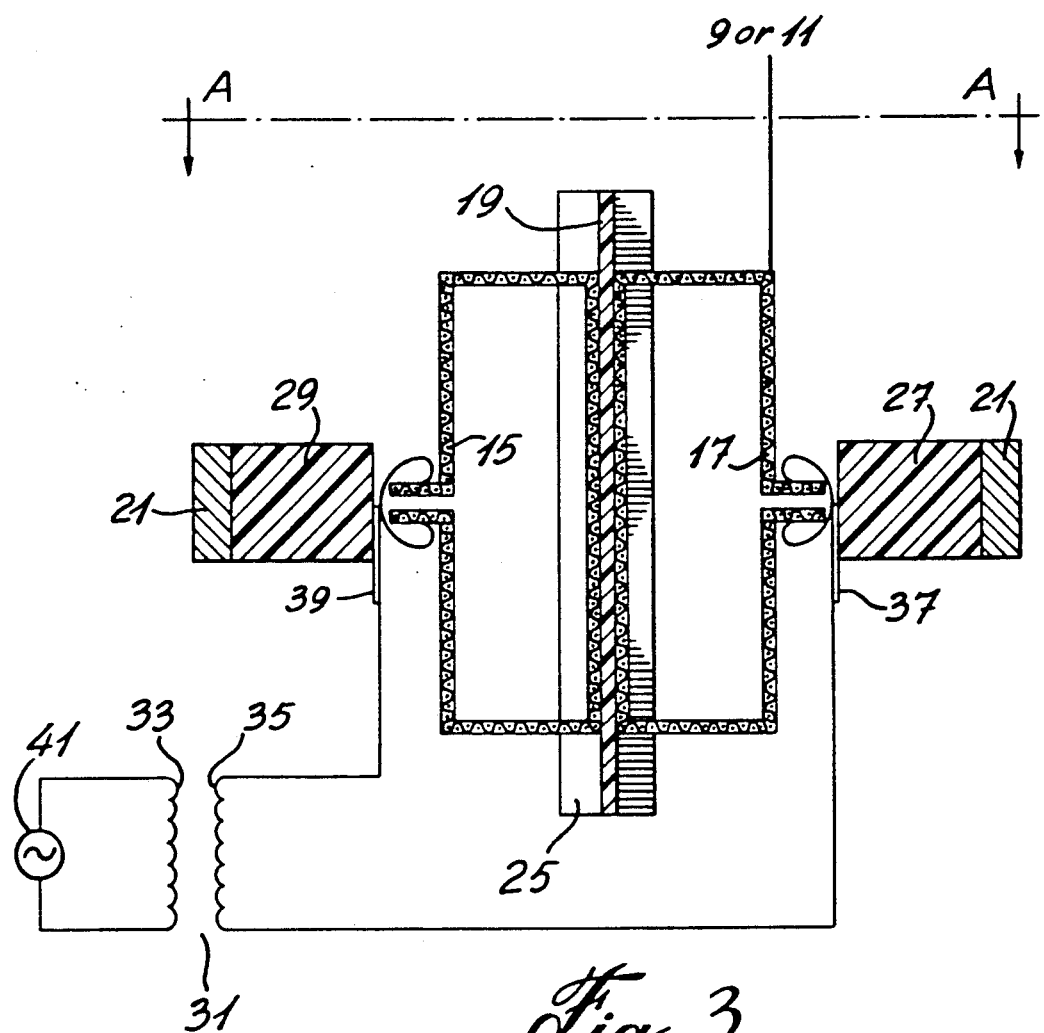
FIG. 3 is a section through A—A of FIG. 2.

Although the ozone generator means 9 and the corona generator means 11 can comprise quite different structures, in the illustrated embodiment, the structure of the ozone generator means 9 and the corona generator means 11 are alike and are further illustrated in FIGS. 2 and 3. Referring to FIGS. 2 and 3, it can be seen that the generator means each comprise a first electrode 15 and a second electrode 17 spaced apart by a dielectric 19. Both electrodes are made of a conductive material and may be a wire mesh material formed into a rectangular tube as seen when considering both FIGS. 2 and 3 or other convenient arrangement to make a close fit between the wire mesh, and the dielectric material. The generator means are carried in a frame 21 having dielectric support means 23 and 25. Stand-offs 27 and 29 support the tubular electrodes 17 and 15 respectively.

FIG. 3 illustrates schematically how a transformer is connected to the electrodes. As seen in FIG. 3, the transformer 31, which has a primary 33 and a secondary 35, has one end of the secondary connected, at 37, to the electrode 17, and the other end of the secondary connected, at 39, to electrode 15. AC source 41 drives the generator means.

The ozone generator means 9 may comprise tubular electrodes 15 and 17 as illustrated in FIGS. 1 to 3 herein, or it may use a series of plates for providing the electrode structures. Other structures, as is well known in the art, may be used for forming the electrodes of the ozone generator.

The dielectric 19 preferably comprises a material of a high dielectric constant, in the range of 50 to 100, such as titanium dioxide or perovskites, or other materials well known in the art. A rectangular grill structure for the electrodes is preferred so as to facilitate maximum air contact.

In operation, the voltage of source 41 is kept only a little above the corona start voltage to minimize ion and oxides of nitrogen formation. A preferred voltage is in the range of 2000–4500 volts AC RMS. To achieve adequate ozone production, a sufficient area of the corona produced by the ozone generator must be used. This also facilitates greater potential air contact. As is well known in the art, power in the corona can be increased by increasing frequency. In accordance with the invention, the concentration of the ozone produced should be greater than 20 parts per million and preferably in the range of 20–40 parts per million.

The structure of the corona generator means 11 is, as above-mentioned, in the illustrated embodiment, similar to the structure of the ozone generator means 9. The dielectric will once again consist of a material having a high dielectric constant, having a value of 1000 or greater, such as a perovskite. Thus, it can be seen that the dielectric constant of the material forming the dielectric in the corona generator means is more than 10 to 20 times as great as the dielectric constant of the material forming the dielectric in the ozone generator means. The corona produced by the corona generator means 11 is very intensive, in accordance with the invention, with corona power of 3 watts/sq. in. or greater but does not produce substantial ozone.

Once again, the voltage is kept only a little above the corona start voltage to minimize oxides of nitrogen formation. A preferred range of voltage is 2000–4500 volts AC RMS. To give adequate effect, sufficient area of corona must be used.

The corona generator means 11, in addition to its effect in removing ozone, has been noted to have other useful results, for example, it will oxidize air contaminants such as ethylene passing through it. Given the power of the electric field, it would appear that air passing through the corona region of the corona generator means could also benefit from a germicidal action. Thus, under some conditions of contaminants or impurities, the corona generator means by itself is sufficient to purify impure air.

Figure 4:
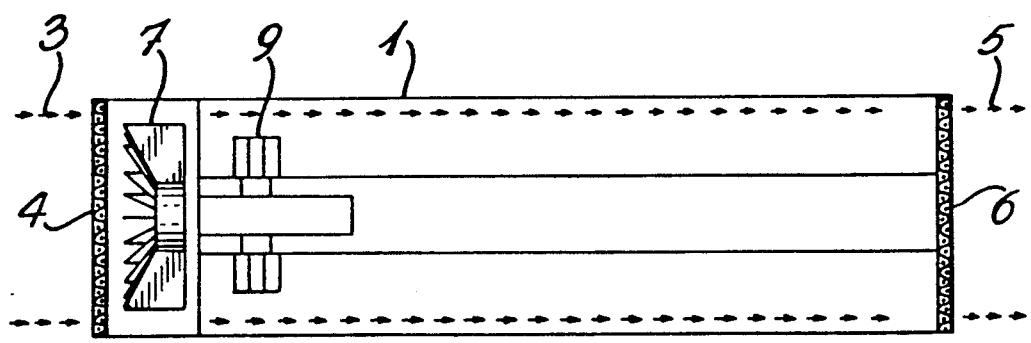
FIG. 4 is a schematic illustration of a second embodiment of an air purifier in accordance with the invention which includes only a corona generator means having a very intensive corona.

Thus, in a second embodiment of the invention, the inside of the container would contain only the corona generator means 11 and would not include the ozone generator means 9. In the latter embodiment, illustrated in FIG. 4, the corona generator means 11 is disposed at the input end of the container 1.

In operation, the system of FIGS. 1, 2 and 3 works as follows:

Both the ozone generator means 9 and the corona generator means 11 are set into operation so that the ozone generator means 9 produces ozone in the desired concentration, and the corona generator means 11 produces a high intensity corona. Impure air from the surrounding environment is drawn in to the container 1 by the fan 7 through openings in the grill 4 at the input end 3 of the container 1. The impure air is then passed over the ozone generator means, and the ozone and impure air continue through towards the output end 5 of the container. The ozone will react with the impurities in the air to remove these impurities so that, as the air approaches the corona generator means 11, the impurities will be removed. However, not all of the ozone will react with the impurities so that some ozone will remain in the air as it passes over the corona generator means 11. The ozone will be destroyed by the action of the corona as it passes over the corona generator means 11 so that, air expelled from the output end 5 of the container 1 will not only be purified but will also be substantially ozone free.

In the case of the second embodiment, i.e., where the container contains only a corona generator means, the air which passes over the corona generator means 11 will be purified before it is expelled from the output end 5 of the container 1. As substantially no ozone was generated to begin with, the air which emerges from the container will, of course, be substantially ozone free.

Figure 5:
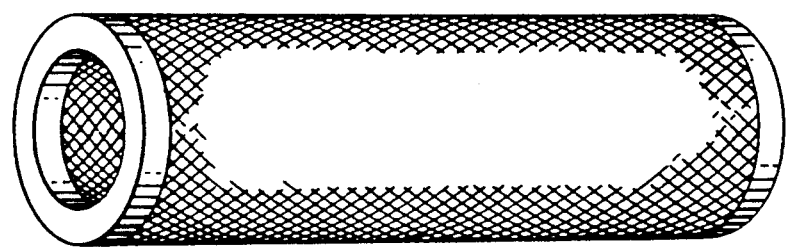
FIG. 5 illustrates an alternative arrangement for the ozone generator/corona generator means of FIG. 1 which comprises a single dielectric with a varying dielectric constant.

The ozone generator means 9 and the corona generator means 11 may be replaced with the arrangement as illustrated in FIG. 5. In FIG. 5, an arrangement comprises a dielectric tube, for example, a cylinder 41, having a first electrode 43 on its outer surface and a second electrode 45 on its inner surface. The dielectric constant of the tube 41 increases in the direction of the arrow B so that the dielectric constant at the left-hand end is lower than the dielectric constant at the right-hand end. Thus, when a potential difference is applied across the gap between the electrodes, ozone will be produced at the left-hand end and a high intensity corona will be produced at the right-hand end.

Although continuous electrodes could be used, it would also be possible to use two sets of electrodes. Thus, the electrode 43 could be split into two electrodes 43A and 43B with electrode 43A extending from the left-hand end to E1, and the electrode 43B extending from E2 to the right-hand end. Electrode 45 would be similarly split up. In the latter embodiment, potential difference would have to be applied across the gap between each set of electrodes. Thus, a secondary would have to be connected with one end of the secondary connected to electrode 43A and the other end of the secondary being connected to the electrode 45A. The secondary of a second transformer would be connected so that one end of the secondary is connected to electrode 43B while the other end of the secondary is connected to electrode 45B.

Figure 6:
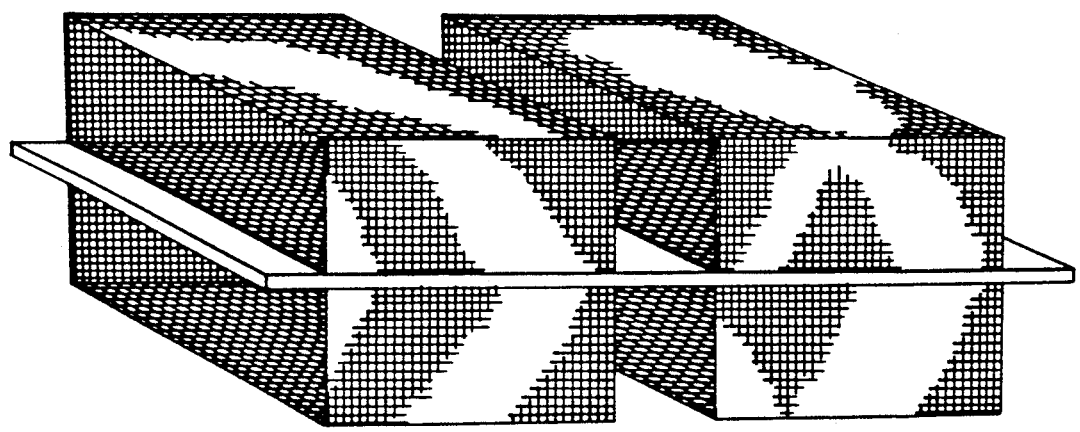
FIG. 6 illustrates an alternate embodiment of the embodiment illustrated in FIG. 5.

It is of course possible to apply the concept of a dielectric with increasing dielectric constant using a flat plate dielectric as illustrated in FIG. 6. In FIG. 6, the dielectric constant of dielectric 51 increases in the direction of the arrow C. Once again, two sets of electrodes (53, 55) and (57, 59) could be used, or 53 and 57 could be joined together as a continuous electrode and 55 and 59 could similarly be joined together as a continuous electrode.

The use of arrangements as illustrated in FIGS. 5 and 6 would permit the production of a more compact air purifier system.

Although several embodiments have been described, this was for the purpose of illustrating, but not limiting, the invention. Various modifications, which will come readily to the mind of one skilled in the art, are within the scope of the invention as defined in the appended claims.

We claim:

1. An air purifying system comprising:
    a closed container having an input end, for receiving impure air, and an output end, through which purified air is expelled;
    means for drawing impure air into said closed container at said input end thereof;
    ozone generator means, for producing a high concentration of ozone, inside said closed container, adjacent said input end thereof;
    corona generator means, disposed in said closed container, adjacent said output end thereof;
    said corona generator means including a dielectric made of a material having a dielectric constant of 1000 or greater;
    whereby, said impure air drawn in at said input end passes over said ozone generator means, said ozone thereby reacting with said impurities of said impure air to provide purified air, said purified air with remaining ozone passing over said corona generating means;
    whereby, ozone remaining in said purified air is destroyed by the corona of said corona generating means instead of being expelled out of said second end of said closed container.

2. A system as defined in claim 1 wherein said input end comprises openings through which said impure air can be drawn into said container;
    said means for drawing impure air into said closed container comprising fan means.

3. A system as defined in claim 2 wherein said ozone generator means comprises:
    a first flat dielectric plate having a first surface and a second surface;
    a first electrode disposed on first surface of said first plate and a second electrode disposed on the second surface of said first plate.

4. A system as defined in claim 3 wherein said electrodes comprise tubular members made of a wire mesh material.

5. A system as defined in claim 4 wherein said first plate has a dielectric constant in the range of 50 to 100.

6. A system as defined in claim 5 wherein the concentration of ozone produced by said ozone generator means is in the range of 20 to 40 parts per million.

7. A system as defined in claim 6 wherein said corona generator means comprises;
    a second flat dielectric plate having a first surface and a second surface;
    a third electrode disposed on the first surface of said second plate; and
    a fourth electrode disposed on the second surface of said second plate.

8. A system as defined in claim 7 wherein the dielectric constant of said second dielectric plate is greater than 1000.

9. A system as defined in claim 8 wherein said corona generator means produces an electric field of 3 watts/sq. in. or greater.

10. A system as defined in claim 2 wherein said ozone generator means and said corona generator means comprise a combined ozone/corona generator means, comprising;
    a single dielectric member having a dielectric constant which increases from said input end to said output end; and electrode means disposed on either side of said dielectric member.

11. A system as defined in claim 10 wherein said dielectric member comprises a tubular member having an outer surface and an inner surface;
said electrode means comprising;
a first electrode arrangement disposed on the outer surface of said tubular member; and
a second electrode arrangement disposed on the inner surface of said tubular member.

12. A system as defined in claim 11 wherein said tubular member comprises a cylindrical member.

13. A system as defined in claim 12 wherein said first electrode arrangement comprises a first outer electrode on the outer surface of said cylindrical member at said input end; and
a second outer electrode disposed on the outer surface of said cylindrical member at said output end; and
said second electrode arrangement comprises a first inner electrode disposed on the inner surface of said cylindrical member at said input end; and
a second inner electrode disposed on the inner surface of said cylindrical member at said output end.

14. A system as defined in claim 10 wherein said dielectric member comprises a flat plate having a top side and a bottom side;
a first electrode arrangement disposed on the top side of said flat plate; and
a second electrode arrangement disposed on the bottom side of said flat plate.

15. A system as defined in claim 14 wherein said first electrode arrangement comprises a first top electrode disposed on said top side of said plate at said input end and a second top electrode disposed on the top side of said flat plate at said output end; and
said second electrode arrangement comprises a first bottom electrode disposed on the bottom side of said flat plate adjacent said input end and a second bottom electrode disposed on said bottom side adjacent said output end.

16. An air purifier system, comprising:
a closed container having an input end, for receiving impure air, and an output end through which purified air is expelled;
means for drawing impure air into said closed container at said input end thereof;
corona generator means inside said closed container adjacent said input end thereof;
whereby, said impure air drawn in at said input end passes over said corona generator means to provide purified air purified by the corona generated by said corona generator means;
said purified air being expelled out of said second end of said closed container;
said corona generator means including a dielectric made of a material having a dielectric constant of 1000 or greater.

17. A system as defined in claim 16 wherein said corona generator means comprises;
a flat dielectric plate having a first surface and a second surface;
a first electrode disposed on the first surface of said second plate; and
a second electrode disposed on the second surface of said second plate.

18. A system as defined in claim 17 wherein the dielectric constant of said dielectric plate is greater than 1000.

19. A combination ozone/corona generator means, comprising:
a single dielectric member having a dielectric constant which increases from one end to the other end thereof;
said dielectric member being made of a material having a dielectric constant of 1000 or greater at said other end; and
electrode means disposed on either side of said dielectric member.

20. A system as defined in claim 19 wherein said dielectric member comprises a tubular member having an outer surface and an inner surface;
said electrode means comprising:
a first electrode arrangement disposed on the outer surface of said tubular member; and
a second electrode arrangement disposed on the inner surface of said tubular member.

21. A system as defined in claim 20 wherein said tubular member comprises a cylindrical member.

22. A system as defined in claim 21 wherein said first electrode arrangement comprises a first outer electrode on the outer surface of said cylindrical member at said first end; and
a second outer electrode disposed on the outer surface of said cylindrical member at said second end; and
said second electrode arrangement comprises a first inner electrode disposed on the inner surface of said cylindrical member at said first end; and
a second inner electrode disposed on the inner surface of said cylindrical member at said second end.

23. A system as defined in claim 19 wherein said dielectric member comprises a flat plate having a top side and a bottom side;
a first electrode arrangement disposed on the top side of said flat plate; and
a second electrode arrangement disposed on the bottom side of said flat plate.

24. A system as defined in claim 23 wherein said first electrode arrangement comprises a first top electrode disposed on said top side of said plate at said first end and a second top electrode disposed on the top side of said flat plate at said second end; and
said second electrode arrangement comprises a first bottom electrode disposed on the bottom side of said flat plate adjacent said first end and a second bottom electrode disposed on said bottom side adjacent said second end.

* * * * *